Figure 1:
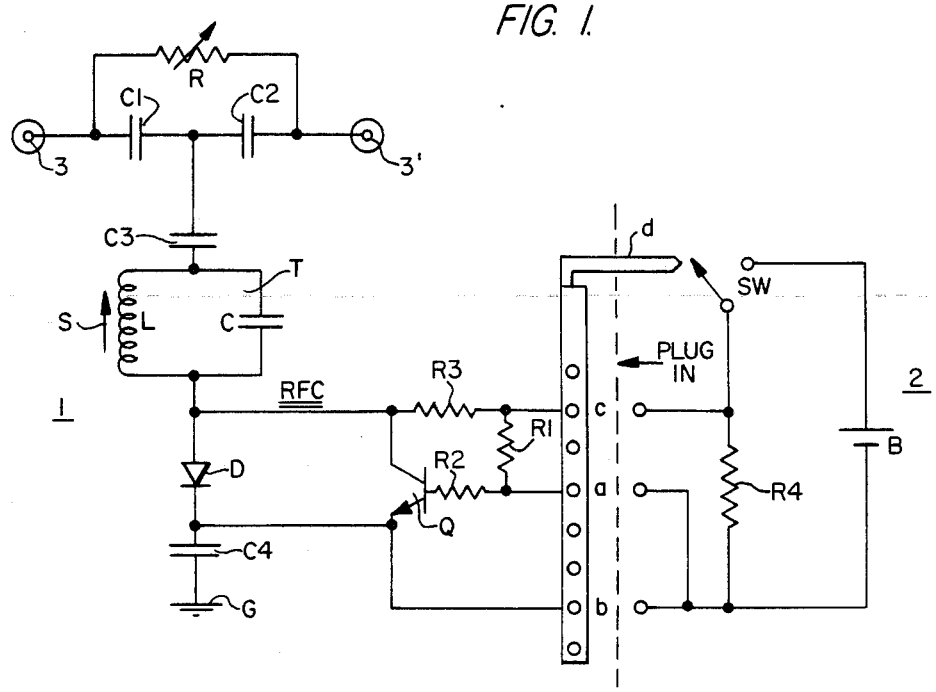

United States Patent [19]

Scherer et al.

[11] Patent Number: 4,567,516
[45] Date of Patent: Jan. 28, 1986

[54] SPECIAL PROGRAM DECODING OF SCRAMBLED SUBSCRIPTION TELEVISION TRANSMISSIONS

[75] Inventors: George Scherer, East Brunswick; Walter Joswick, Metuchen; Isaac S. Blonder, Morganville, all of N.J.

[73] Assignee: Blonder-Tongue Laboratories, Inc., Old Bridge, N.J.

[21] Appl. No.: 412,780

[22] Filed: Aug. 30, 1982

[51] Int. Cl.[4] .................. H04N 7/16; H04K 1/00
[52] U.S. Cl. .............................. 358/114; 320/13; 320/37; 320/38; 340/825.31; 358/115; 455/349
[58] Field of Search ............... 358/114, 115, 116, 117, 358/118; 455/349; 340/825.31; 320/13, 37, 38

[56] References Cited

U.S. PATENT DOCUMENTS 3,560,802  2/1971  Mountjoy et al. .................. 320/37
3,813,482  5/1974  Blonder ............................ 178/5.1
4,084,123  4/1978  Lineback .......................... 320/2
4,095,258  6/1978  Sperber ............................ 358/120
4,099,203  7/1978  Garodnick et al. ................ 358/118
4,325,078  4/1982  Seaton et al. ..................... 358/117

FOREIGN PATENT DOCUMENTS 2411527  8/1979  France ............................ 358/114

Primary Examiner—S. C. Buczinski
Attorney, Agent, or Firm—Rines and Rines Shapiro and Shapiro

[57] ABSTRACT

This disclosure is concerned with a limited time operative decoder for special scrambled television program transmissions involving a voltage source for energizing the decoder of limited time effectiveness adapted to energize the decoder only during the limited time of the special scrambled television program.

21 Claims, 4 Drawing Figures

SPECIAL PROGRAM DECODING OF SCRAMBLED SUBSCRIPTION TELEVISION TRANSMISSIONS

The present invention relates to subscription television transmission and decoding, being more particularly concerned with scrambled television transmissions over the air or by cable which are to be received on a special basis, as for a limited programs or limited period of time, by a home user.

Successful scrambling or distortion-encoding techniques for television transmissions and decoding systems for enabling subscribers to remove the scrambling and view undistorted transmissions have been described in Letters U.S. Pat. Nos. 3,813,482 and 4,095,258 of Blonder-Tongue Laboratories, Inc., the assignee of the present invention. While these have been found to work satisfactorily in commerce, there are occasions where a special program of limited time duration is to be featured in the scrambled television programming and limited life decoding equipment for one-time or limited time subscribers is desired. It is to this problem of providing a decoder that is adapted to be rendered ineffective after the desired limited time program has been decoded or unscrambled and viewed by a subscriber, that the present invention is directed; it being an objective also to avoid the necessity for obsoleting or discarding the total decoding equipment or the principal electronic portions thereof to prevent its continued use.

It is an object of the invention, accordingly, to provide a new and improved method of and apparatus for decoding scrambled television programs and the like that is particularly suited to special time-limited program subscription, and which enables the decoder to be rendered ineffective or unusable after such use, but without loss of the primary electronic and related decoding equipment for possible future authorized limited-time subscription use.

A further object is to provide a new and improved scrambled signal decoder of more general utility, as well.

Other and further objects will be explained hereinafter and are more particularly pointed out in the appended claims.

In summary, from one of its broader viewpoints, the invention embraces decoding apparatus for subscription scrambled television program of specialized nature and limited period of time reception, having, in combination, a base unit comprising passive electronic circuit means adapted, when energized, to decode the scrambling on a received television program transmission; a disposable energizing unit comprising a limited life voltage source connected in circuit with normally open switching means and dissipation means for bleeding the voltage of the voltage source when the switching means is closed; means for plugging the energizing unit into the base unit comprising means operable upon such plug-in for closing the switching means and connecting the voltage source to the base unit electronic circuit to energize the same and permit the decoding of the scrambled television program for the duration of the life of the voltage source; the dissipation means being adjusted so that upon the plug-in of the energizing unit, the voltage source is sufficiently dissipated to insure insufficient life to energize the base unit electronic circuit after the limited period of time of the specialized television program. Preferred embodiments and best mode of operation and apparatus are hereinafter delineated.

Figure 3:
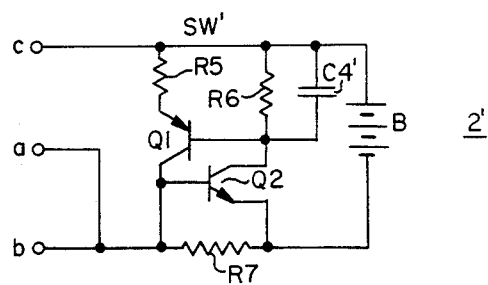
Figure 2A:
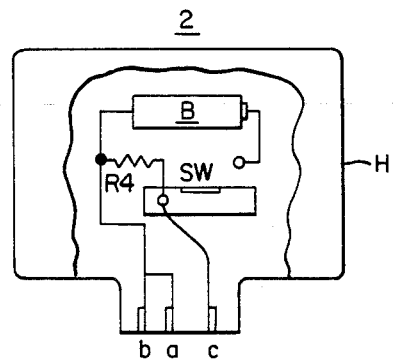
Figure 2B:
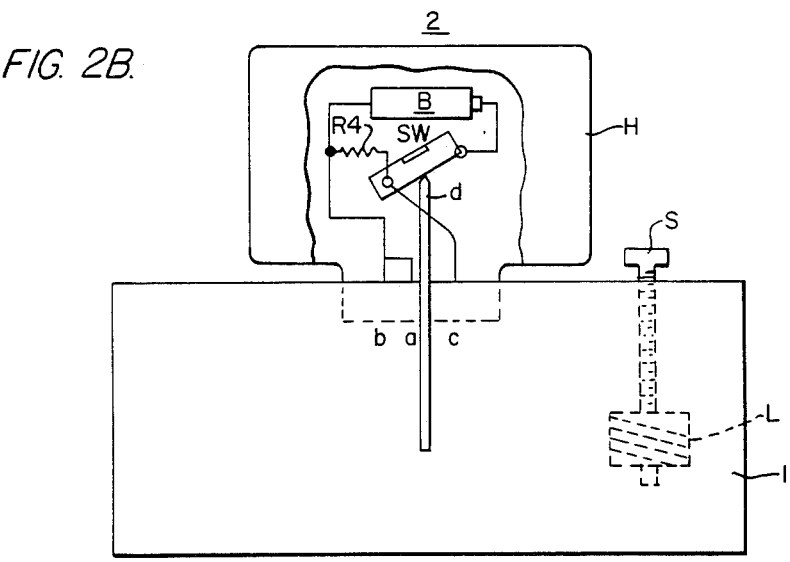

The invention will now be described in connection with the accompanying drawing, FIG. 1 of which is a schematic circuit diagram illustrating the invention in preferred form, embodying the method underlying the same:

FIGS. 2A and 2B are elevation views, partly broken away to illustrate details, showing a preferred type of construction for realization of the circuit of FIG. 1 involving a disposable plug-in energizing unit; and FIG. 3 is a partial circuit diagram of a modification.

Referring to FIG. 1, a base unit which will remain permanently with the television subscriber at the television receiver installation is shown generally at 1, and a disposable plug-in energizing unit adapted to be plugged into the base unit 1 for the purpose of enabling only a limited period of time of use for a specialized scrambled television program decoding function, is shown schematically at 2. While the scrambling techniques may be those described in said Letters Patent or other types of well-known picture and sound distorting systems, for purposes of illustration, the invention is described in connection with the decoding of a scrambled television transmission of the type embodying a carrier that has been employed at the television station to introduce the scrambling or encoding distortion into the transmission. The base unit 1 of FIG. 1, therefore, is shown fundamentally embodying a trap T shown comprising a capacitor C and variable inductance L which is tunable to such a scrambling carrier frequency to serve as a notch filter for the elimination of the same. The television transmission, as received in the television receiver set tuner, is applied at the coaxial input 3, and the decoded or unscrambled output resulting from the notching action of an operative or effective trap T will be fed back to the television receiver from the coaxial output 3'. The other elements of the T-type network comprising the trap are a variable resistor or potentiometer R and series-connected capacitors C1 and C2 shunting the resistor R to form a parallel branch, with a capacitor C3 connected to the junction of C1 and C2 and to the upper terminal of the network L-C. The lower terminal of the trap T is returned by a diode D through a by-pass capacitor C4 to the ground terminal G (actual earthing or chassis or other reference potential).

The inductance L may have a tuning plunger or screws which, in preferred form, is available to the user at the base unit 1 (FIG. 2B) for making final tuning adjustments to cause the trap to notch out the interfering carrier.

The diode D suitably is a PIN diode which has the characteristics that when current is flowing from the plug-in energizing module 2, the diode will present a low impedance and will connect the lower portion of the trap L-C to ground through C4. When no current is flowing, diode D presents a high impedance and the trap is disconnected from the circuit, resulting in no decoding action.

Transistor Q is a voltage or current-sensitive element within the base unit 1 that provides a mode of security against the attempted use of an external voltage source other than the proper energizing module 2. If such an unauthorized attempt to use a substitute external voltage source with the base unit passive electronics 1 is made, there will be no connection at plug-in point, pin or terminal a and the transistor Q will be biased "on"

through resistors R1 and R2, resulting in the dc current being shunted away from diode D, with no decoding action possible. When the proper energizing module 2 is used, plug-in point a is connected to plug-in point b and transistor Q is disconnected from the circuit. Resistor R3 is a current-limiting resistor connected to plug-in point c from the energizing module. Its purpose is to confine the current flow through diode D to pre-established values.

The base unit electronic circuitry 1 is thus a passive circuit unless appropriate voltage or energy is supplied to it by the disposable plug-in energizing unit 2. That unit comprises a voltage source battery B which will supply current through a switch SW to plug-in point or terminal c and on towards the trap circuit T. The normally open switch is of a latching type such that when the plug-in energizing unit 2 is manually inserted into the unit 1, it will latch closed by the thrusting action of pin d and remain closed. The current will then be supplied through R3. Resistor R4, shunting the battery B when switch SW is closed, serves as a dissipation element to maintain drain on or bleeding of the battery even in the event that the energizing module 2 is removed from the base unit circuit 1 after initial plug-in. In this manner, the value of the resistor R4 (and the other circuit components) is adjusted such that the battery B will only have a limited effective life for operating or rendering the passive electronic base unit circuit 1 effective, such that the plug-in energizing unit 2 will only be useful for energizing the decoder of the base unit 1 for a period of time corresponding substantially to the period of time of the specialized scrambled program transmission. As before intimated, even the removal of the plug-in unit 2 prematurely will not restrain the continued dissipation action of the resistor R4, leaving insufficient life in the voltage source B for further energization of the base unit 1. The plug-in unit 2 is thus disposable after the intended use, and the base unit 1 is preserved but is unusable without a further appropriate plug-in energizer unit 2.

While the system of FIG. 1 has been described in connection with mechanical switching means SW, it is clear that electronic switching means may also be employed as shown in the modified energizing unit 2' of FIG. 3. In FIG. 3, the battery B again is shown connectable through an electronic switching mechanism to terminal points c, a and b of the base unit 1. The switch comprises transistors Q1 and Q2 connected as an electronic latch circuit. When current flows through or out of point c into point b through the base-emitter junction of Q2, the latter is energized and thus energizes Q1, connecting dissipation resistor R5 across the voltage source B, as was done with R4 in the module 2 of FIG. 1. Once thus turned on and initiated, the current flowing through R5 continues to flow through the base-emitter junction of Q2 and maintains current flow until the battery B is dissipated; again, the adjustment of values being effected to be related to the limited time of special program transmission.

Considering, for example, a scrambling carrier frequency of the order of 63 megahertz, the base unit trap T may have an inductance L of about 0.36 microhenries and the capacitor C a value of about 13 picofarads. Capacitors C1 and C2 may have a value of 33 picofarads and capacitor C3, 11 picofarads. The PIN diode D may be of the type BA244 and the by-pass capacitor C may have a value of about 1,000 picofarads. The transistor Q may be of the Blonder-Tongue type SPS6607, and resistors R1, R2 and R3 may have respective values of about 1,500 ohms for R1, about 100 ohms for R2, and about 56 ohms for R3. The dissipation resistor R4 in the plug-in energizer unit 2 of FIG. 1 may have a value of about 680 ohms with a battery B such as a 1.5 volt carbon-zinc cell. In the modification of FIG. 3, transistors Q1 and Q2 may be of the Blonder-Tongue types SPS6608 and SPS6607; the dissipation resistor R5 may have a value of about 4,700 ohms; and the resistors R6 and R7 may respectively have values of about 4,700 ohms and 1,000 ohms. Capacitor C4' of FIG. 3 which is used to prevent transients on the line from falsely energizing the module, may have a value of about 0.1 microfarads. The voltage source B, in the instance of the modified plug-in energizer unit 2' of FIG. 3, may be a 9-volt carbon-zinc battery.

Turning to the physical lay-out for the plug-in energizer and base units of the invention, illustrated in connection with the embodiment of FIG. 1, reference may be made to FIGS. 2A and 2B, in which the base unit 1 is shown receiving the plug-in energizing unit 2, with the battery B, dissipation load resistor R4, and mechanical latch switch SW shown protected within the housing H of the plug-in unit 2 so as to prevent internal physical access to or tampering with the switch.

While, as before stated, the invention has been described in connection with the preferred plug-in disposable energizing unit that retains the usefulness or re-use characteristics of the base unit for future plug-in energizing units, there may be instances where the matter of cost and continued use is not a factor. In such event, the voltage source B, any suitable externally normally activated switch SW, dissipation resistor R4 and the circuitry connected to the pin diode D may be integrally constructed within the base unit assembly with the whole assembly disposable after the effective life of the battery B, tailored to the desired period of time of use, as before explained.

While the particular type of scrambling and decoding described in connection with the circuits illustrated in FIGS. 1 and 3 are preferred and are relatively simple, clearly other types of decoding circuits responsive to particular scrambling techniques may be used, and the method and technique of the invention may similarly be applied to such systems. Further modifications will also occur to those skilled in this art and all such are considered to fall within the spirit and the scope of the invention as defined in the appended claims.

What is claimed is:

1. Decoding apparatus for subscription scrambled television programs of specialized nature and limited period of time reception, having, in combination, a base unit comprising passive electronic circuit means adapted, when energized, to decode the scrambling of a received television program transmission; a disposable energizing unit comprising a limited life voltage source connected in circuit with normally open switching means and dissipation means for bleeding the voltage of the voltage source when the switching means is closed; means for plugging the energizing unit into the base unit; means operable upon such plug-in for closing the switching means and connecting the voltage source to the base unit electronic circuit to energize the same and permit the decoding of the scrambled television program for the duration of the life of the voltage source; the dissipation means being adjusted so that upon the plug-in of the energizing unit, the voltage source is sufficiently dissipated to insure insufficient life to energize the base unit electronic circuit after the limited period of time of the specialized television program.

2. Decoding apparatus as claimed in claim 1 and in which the said energizing unit is provided with means for continuing the dissipation of the voltage source after plug-in, even if the energizing unit is removed from the base unit.

3. Decoding apparatus as claimed in claim 1 and in which the said electronic circuit is provided with voltage or current-sensitive means which prevents operation of the electronic circuit if voltage from a source other than the voltage source of said energizing unit is applied to the base unit.

4. Decoding apparatus as claimed in claim 1 and in which the said switching means is a mechanically operable latching switch and the plugging means includes means for closing said switch.

5. Decoding apparatus as claimed in claim 4 and in which the said switching means following plug-in is maintained closed within the energizing unit and the energizing unit has means for preventing said switching means from being opened.

6. Decoding apparatus as claimed in claim 1 and in which said switching means comprises electronic switch means operable to an effective closed circuit position upon the flow of current from the voltage source upon plug-in of the energizing unit into the base unit.

7. Decoding apparatus as claimed in claim 1 and in which said base unit electronic circuit comprises a trap tunable when effective to eliminate a scrambling carrier frequency in the television program transmission.

8. Decoding apparatus for the reception of subscription scrambled television programs of specialized nature and limited period of time, having, in combination, passive electronic circuit means adapted, when energized, to decode the scrambling of a received television program transmission; an energizing circuit comprising a limited-life voltage source connected in circuit with normally open switching means and dissipation means for bleeding the voltage of the voltage source when the switching means is closed; means for connecting the energizing circuit to the passive means to energize the same upon closing of the switching means to permit the decoding of the scrambled television program for the duration of the life of the voltage source; the dissipation means being adjusted so that after the closing of the switching means, the voltage source becomes sufficiently dissipated to insure insufficient life to energize the electronic circuit after the limited period of time of the specialized television program.

9. Decoding apparatus as claimed in claim 8 and in which said switching means is manually actuated.

10. Decoding apparatus as claimed in claim 8 and in which means is provided for preventing access to said circuit and energizer unit.

11. A method of securely decoding subscription scrambled television programs of specialized nature and limited period of time at a decoder, that comprises, receiving a scrambled program transmission; energizing the decoding of the scrambling, during such receiving, from a voltage source actuable by the subscriber; and dissipating the voltage source to a predetermined extent during such energizing to ensure insufficient life thereof to continue the energizing after the limited period of time of the specialized program, the length of said period of time being less than the energization time capability of said voltage source in the absence of said dissipating.

12. A method as claimed in claim 11 and in which said decoding comprises trapping out a scrambling carrier frequency in the program transmission.

13. A method as claimed in claim 12 and in which access by the subscriber to said energizing and dissipating operations is prevented.

14. A method as claimed in claim 11 and in which said energizing and dissipating steps are effected in a disposable unit, adapted to be plugged into the decoder by the subscriber to initiate said energizing.

15. A method as claimed in claim 14 and in which, once the energizing is initiated, the dissipating continues irrespective of removal of said unit from the decoder.

16. A method as claimed in claim 14 and in which said decoding is maintained unenergized by attempted application of a different voltage source.

17. A method as claimed in claim 11 and in which said dissipating is effected by plugging into a base unit containing said decoder a disposable circuit connected to said voltage source and pre-set for limiting the time of energization by the voltage source.

18. Decoding apparatus for subscription scrambled television program of specialized nature and limited period of time reception, having, in combination, a base unit comprising passive electronic circuit means adapted, when energized, to decode the scrambling on a received television program transmission; a disposable unit having means for plugging the said unit into the base unit and comprising means operable upon such plug-in for connecting a voltage source to energize the base unit electronic circuit and activate the decoding of the scrambled television program; and means provided in said disposable unit for controlling the duration of such energizing of the base unit electronic circuit to limit the activation of the decoding to a predetermined period of time corresponding to that of the specialized television program only, the length of said period of time being less than that for which said voltage source is capable of energizing the base unit in the absence of said controlling.

19. Decoding apparatus as claimed in claim 18 and in which means is provided for preventing unauthorized use upon plug-in of said disposable unit.

20. Decoding apparatus as claimed in claim 18 and in which diode means is employed having characteristics such that only upon plug-in of said disposable unit does it present a low impedance for connecting a decoding trap means into the circuit.

21. A method of securely decoding subscription scrambled television programs of specialized nature and limited period of time at a decoder, that comprises, receiving a scrambled program transmission; energizing the decoding of the scrambling, during such receiving, from a voltage source actuable by the subscriber; and controlling the energizing from the voltage source during such energizing to ensure non-continuance of the energizing after the limited period of time of the specialized program, said controlling being effected by plugging into a base unit in which said receiving is conducted a disposable circuit pre-set for limiting the time of energization of the voltage source to ensure said non-continuance, the length of said period of time being less than the energization time capability of said voltage source in the absence of said controlling.

* * * * *